United States Patent [19]

Takahashi et al.

[11] Patent Number: 5,795,421
[45] Date of Patent: Aug. 18, 1998

[54] METHOD FOR PREPARING A PANEL WITH A RESINOUS FRAME

[75] Inventors: Kazuhiro Takahashi; Hideyuki Hashimoto; Hisashi Takeda, all of Aichi, Japan

[73] Assignee: Asahi Glass Company Ltd., Tokyo, Japan

[21] Appl. No.: 663,451

[22] Filed: Jun. 13, 1996

[30] Foreign Application Priority Data

Jun. 13, 1995 [JP] Japan ................................. 7-146467

[51] Int. Cl.$^6$ ............................ B60J 10/02; B60R 13/06
[52] U.S. Cl. ............ 156/108; 156/107; 156/244.18; 156/244.27; 264/177.17; 264/252
[58] Field of Search ............ 156/107, 108, 156/244.11, 244.18, 244.27, 800; 264/252, 177.17, 177.19

[56] References Cited

U.S. PATENT DOCUMENTS

| | | |
|---|---|---|
| 2,646,378 | 7/1953 | Morin . |
| 3,239,402 | 3/1966 | Ecklund et al. . |
| 4,844,762 | 7/1989 | Schröder ........................ 156/244.27 |
| 5,057,265 | 10/1991 | Kunert et al. . |
| 5,183,522 | 2/1993 | Arima . |
| 5,362,428 | 11/1994 | Tsujino et al. . |
| 5,445,780 | 8/1995 | Yada e tal. ....................... 156/107 X |
| 5,478,516 | 12/1995 | Malm et al. ..................... 264/17.17 X |
| 5,480,504 | 1/1996 | Gold .................................... 156/108 |
| 5,489,409 | 2/1996 | Koganezawa et al. . |
| 5,558,828 | 9/1996 | Yada et al. .................... 156/244.27 |

FOREIGN PATENT DOCUMENTS

| | | |
|---|---|---|
| 0568014 | 11/1993 | European Pat. Off. . |
| 57-158479 | 9/1982 | Japan . |
| 2285277 | 7/1995 | United Kingdom . |

*Primary Examiner*—Michael W. Ball
*Assistant Examiner*—Sam Chuan Yao
*Attorney, Agent, or Firm*—Sughrue, Mion, Zinn, Macpeak & Seas, PLLC

[57] ABSTRACT

A shaped product for a frame which is extruded from a shaping die in a predetermined shape is pulled by a pulling device toward a pressing member to be passed through the pressing member. A panel which is held by an operating robot has a peripheral portion inserted into an inserting portion in the pressing member. The panel is moved so as to relatively move the pressing member with respect to the panel and along the peripheral portion thereof. The shaped product is passed through a hollow portion in the pressing member to be unified to the panel, thereby obtaining the panel with the frame wherein the frame has good appearance and the outer size of the panel with the frame is accurate.

20 Claims, 6 Drawing Sheets

METHOD FOR PREPARING A PANEL WITH A RESINOUS FRAME

BACKGROUND OF THE INVENTION

The present invention relates to a method for preparing a panel with a resinous frame which is suitable to a windowpane for vehicles and buildings.

A windowpane for vehicles and buildings has usually had a resinous frame such as a molded member or a gasket of synthetic resin attached in a space between a panel such as a glass sheet or plastic sheet and an opening with the panel fitted therein, thereby improving ornamentality and sealing feature.

Attachment of such a resinous frame has been carried out by fitting a preshaped frame into a peripheral portion of a panel interposing an adhesive agent therebetween. However, such attachment has created problems in that it is difficult to automate operations because of need for human hands in most of the operations, and that presence of a lot of operation steps requires a substantial cost.

In order to solve those problems, there has been proposed a so-called encapsulation method wherein a synthetic resin or its raw material is injected into a mold cavity with a panel arranged therein to form a resinous frame at a peripheral portion of the panel in a one-piece construction (see JP-A-57158481 and JP-A-5873681).

The encapsulation method has advantages of minimizing labor on shaping and of giving a high degree of dimensional accuracy to a product because the panel is sandwiched between stiff mold halves made of metal and so on, the synthetic resinous material or its raw material is injected into the cavity defined by the peripheral portion of the panel and an inner surface of the mold. On the other hand, the method creates a problem wherein when the panel is a glass sheet, the glass sheet is very fragile on clamping because of in particular a warp or insufficient bending working accuracy thereof. In order to prevent the glass sheet from being broken on clamping, there has been proposed a mold which is contrived to arrange elastic members on surfaces of the mold halves which the glass sheet contacts with, or to use means such as springs to press the glass sheet at a constant pressure, and which can not completely solve the problem of breakage in the glass sheet.

In U.S. Pat. No. 5,057,265, there is proposed a method wherein a resinous material is extruded from a die in a predetermined shape along a peripheral portion of a glass sheet to form a shaped product for a resinous frame at the peripheral portion of the glass sheet, and the shaped product for the resinous frame is set to unify the glass sheet and the resinous frame.

In the method disclosed in the U.S. patent, because the resinous material is extruded directly onto the glass sheet, vibration due to driving the die is transmitted to the shaped product on shaping to be reflected on a surface of the frame to be shaped, giving poor appearance to the frame.

In JP-A-57158479, there is disclosed a method wherein a pressing jig which is constituted by rollers and so on makes a resinous frame fit on a peripheral portion of a panel and presses it against the panel just after the resinous frame has been extruded. This method can prevent vibration due to driving an extruder or a glass sheet from being reflected on a surface of the panel, hardly being susceptible to poor appearance in comparison with the method disclosed in U.S. Pat. No. 5,057,265.

However, the peripheral size of a finished glass sheet with a frame which is prepared in accordance with the method described in JP-A-57158479 is obliged to comply with the outer size of the glass sheet because the frame is pressed against the glass sheet by the pressing jig such as rollers. Most glass sheet for a vehicle are usually subjected to a bending process, the glass sheet are subject to deviations in the peripheral size on bending. The encapsulation method can shape the resin frame so as to absorb variations in the peripheral size while the method according to JP-A-57158479 is difficult to absorb those variations for the reason stated above.

Furthermore, the method of JP-A-57158479 requires that the frame have solidified to a certain extent before being fitted on the glass sheet because the pressing is carried out by the rollers. However, it is necessary to interpose an adhesive agent between the frame and the glass sheet or add a post-heating process because the bonding force between the frame and the glass sheet becomes weak when the frame has solidified to a certain extent.

SUMMARY OF THE INVENTION

It is an object of the present invention to provide a new method for preparing a panel with a resinous frame capable of solving the disadvantages of the prior art.

The foregoing and other objects of the present invention have been attained by providing a method for preparing a panel with a resinous frame wherein the resinous frame is unified to at least one surface of the panel at a peripheral portion thereof, comprising extruding a resinous material for the frame in a predetermined shape from a resin shaping die to form a shaped product, and unifying the shaped product to at least one surface of a panel at a peripheral portion thereof; wherein a pressing member is arranged at a position apart from the shaping die at a predetermined distance, the pressing member having a hollow portion formed therein to substantially conform to an outer shape of the frame in section; the shaped product extruded from the die is advanced through the hollow portion; the peripheral portion of the panel is inserted into a panel inserting portion of the pressing member to arrange the pressing member at the peripheral portion of the panel; and the shaped product is unified to the peripheral portion of the panel by pressing the shaped product against the panel while relatively moving the pressing member with respect to the panel and along the peripheral portion thereof.

DETAILED DESCRIPTION OF THE PREFERRED EMBODIMENTS

Figure 1:
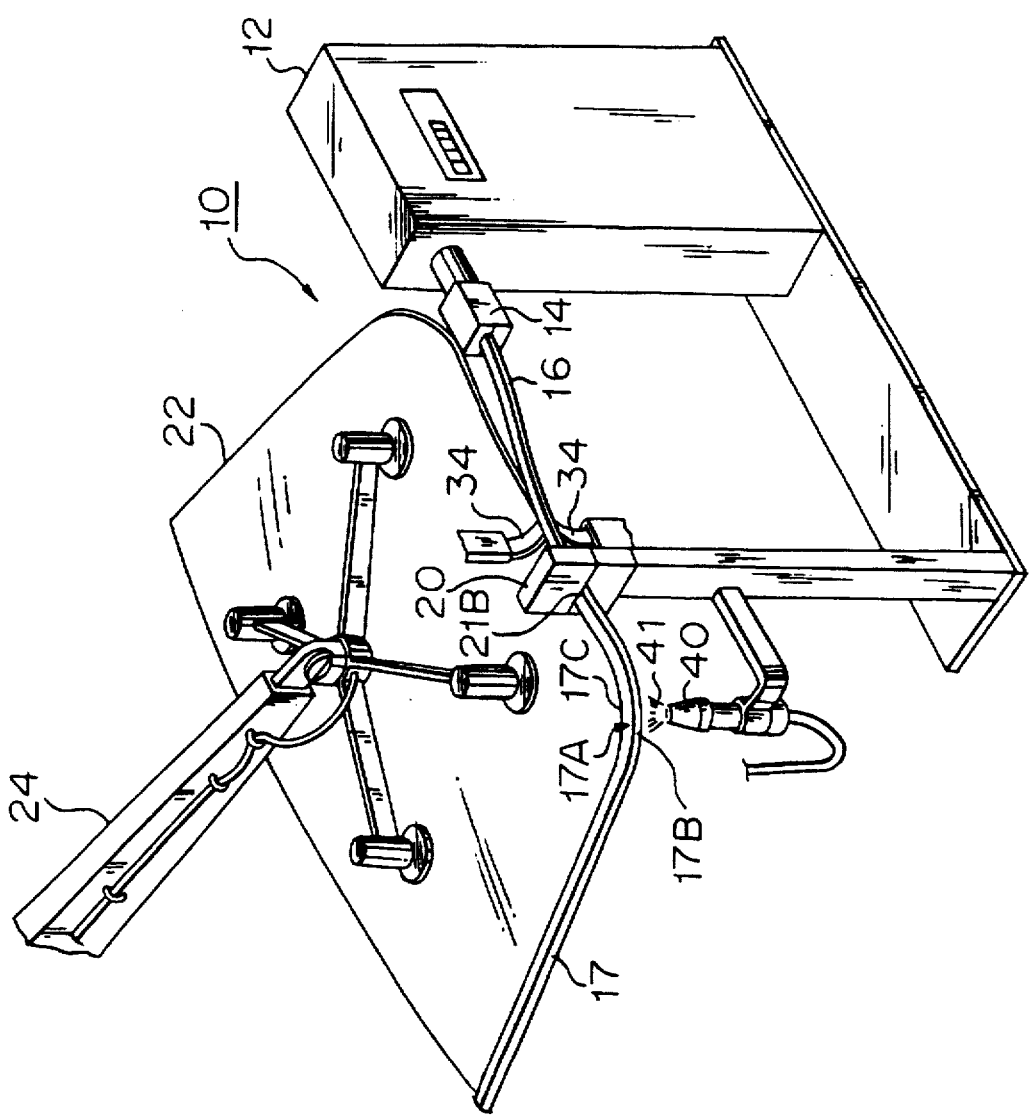
FIG. 1 is a schematic perspective view of an embodiment of a method for preparing a panel with a resinous frame according to the present invention.

Now, the present invention will be described in detail with reference to the accompanying drawings. In FIG. 1, there is shown a schematic perspective view showing an embodiment of the method for preparing a panel with a resinous frame according to the present invention. A shaping die 14 which is attached to the leading edge of an extruder 12 extrudes a resinous material for a frame to form a shaped product 16 for the frame in a predetermined shape. The shaped product 16 is pulled by a pulling device, and the shaped product is located in a pressing member 20 to pass through a hollow portion in the pressing member 20.

A panel 22 is sucked and held by an operating robot 24. By activating the operating robot 24, the panel 22 has a peripheral portion put into an inserting portion of the pressing member 20, and the panel 22 is moved so that the pressing member 20 relatively moves with respect to the panel 22 and along the peripheral portion thereof. By this arrangement, the shaped product 16 passes through the hollow portion in the pressing member 20 to be unified to the panel 22.

If the shaped product 16 has not solidified in a sufficient manner when the shaped product 16 is passing through the hollow portion in the pressing member 20, there is a possibility that poor appearance is given to a surface of the shaped product 16 (i.e. a contact portion with an inner wall of the pressing member) by the pressing member 20. In order to cope with this problem, it is preferable that the shaped product 16 has had an outermost portion solidified to a certain extent on arrival at the pressing member 20 so as to avoid surface irregularities or deformation in shape.

It is preferable to adjust the distance between the shaping die and the pressing member or another factor depending on the temperature, the viscosity or the like in the extruded material for the purpose. If a connection portion of the shaped product with the panel has solidified, the bonding force between the shaped product and the panel becomes insufficient. For these reasons, it is preferable that only the outermost portion of the shaped product has solidified, but that the connection portion of the shaped product with the panel has not solidified. It is recommendable that the outermost portion of the shaped product which has been extruded is quenched before the shaped product reaches the pressing member.

In detail, when the resinous material is of a thermoplastic resinous material, it is possible to solidify only the outermost portion of the shaped product by blowing cooled air on the surface of the shaped product or spraying a liquid. Among these measures, it is preferable to spray liquid nitrogen or the like from the viewpoint that the outermost portion of the shaped product can be cooled in a short period of time. On the other hand, it is acceptable to blow ordinary air in place of liquid nitrogen, which can simplify a required device and minimize the cost. These blowing means (see a member 44 in FIG. 5) may be arranged between the shaping die and the pressing member or at an inlet of the pressing member as long as the surface of the shaped product can be cooled to the extent that the pressing member does not make the appearance of the shaped product poor. The temperature of such a cooling fluid blown on the shaped product ranges from about −10° C. to about 80° C.

By cooling the surface of the shaped product to a temperature which is lower than the temperature of the connection portion of the shaped product with the panel, it is possible to obtain the bonding force between the shaped product and the panel in a sufficient manner without degrading the appearance of a finished frame. When a thermoplastic resin, in particular a polyvinyl chloride resin is used as the resin material for the frame as stated later, the temperature of the material on extrusion ranges from about 150° C. to about 190° C. It is possible to prepare the panel with the frame at good producibility by cooling the surface of the shaped product from a temperature in such range to not higher than 150° C., in particular not higher than 130° C.

Furthermore, it is preferable that the shaped product is quenched just after the shaped product has been unified to the panel (see a member 40 in FIG. 5). This is because the shaped product may be deformed due to thermal shrinkage if the shaped product is cooled only by self-cooling. Specifically, when the frame has a lip (17C in the drawings), remarkable deformation is likely to appear at the lip 17C so that the lip 17C becomes thin or bends up. Such deformation can be avoided by forcibly cooling and solidifying the shaped product before the deformation occurs. In particular, such remarkable deformation is likely to appear at a portion (17A) where the shaped product is unified to a corner of the panel. In order to cope with this problem, the embodiment has such an arrangement that when the panel corner arrives at cooling air blowing means 40, cooling air 41 is blown on the corner.

Figure 2:
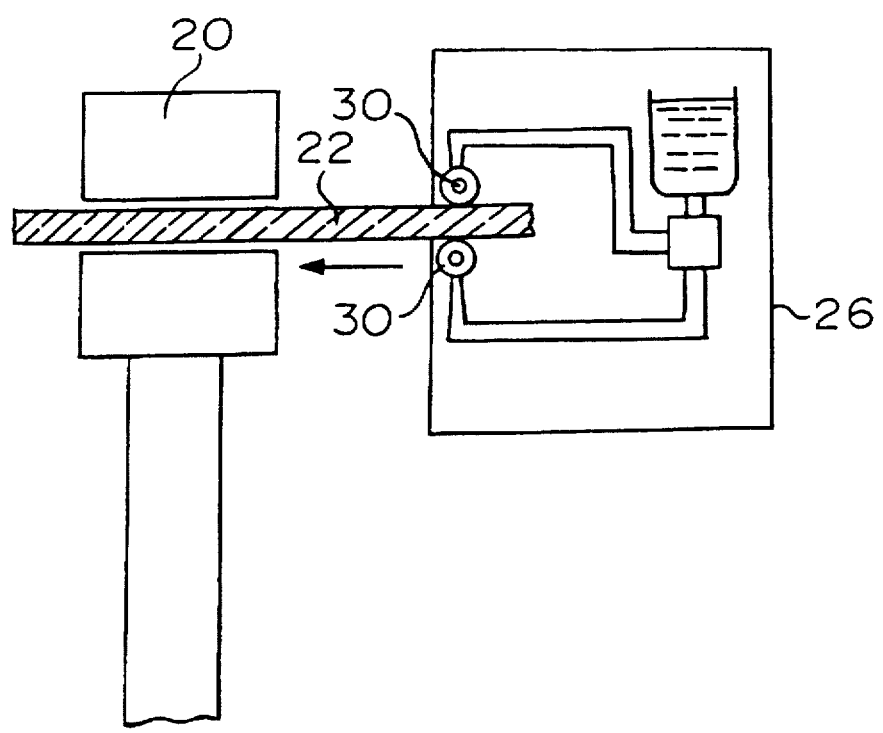
FIG. 2 is a schematic sectional view explaining an example of a primer treatment according to the present invention.

In order to further improve the bonding force between the frame and the panel, it is preferable to apply primer treatment to the peripheral portion of the panel before unify the shaped product and the panel. In FIG. 2, there is shown a schematic sectional view showing an example of the primer treatment. In the example shown, a primer applying jig 26 which includes a pair of rollers 30 are arranged at a suitable position upstream of the pressing member 20 with respect to the relative moving direction of the panel 22 to the pressing member 20. In this manner, primer can be applied to the peripheral portion of the panel 22 to be unified with the frame, moving the panel 22. In FIG. 2, an arrow indicates the direction of the relative movement of the panel with respect to the pressing member.

Figure 3:
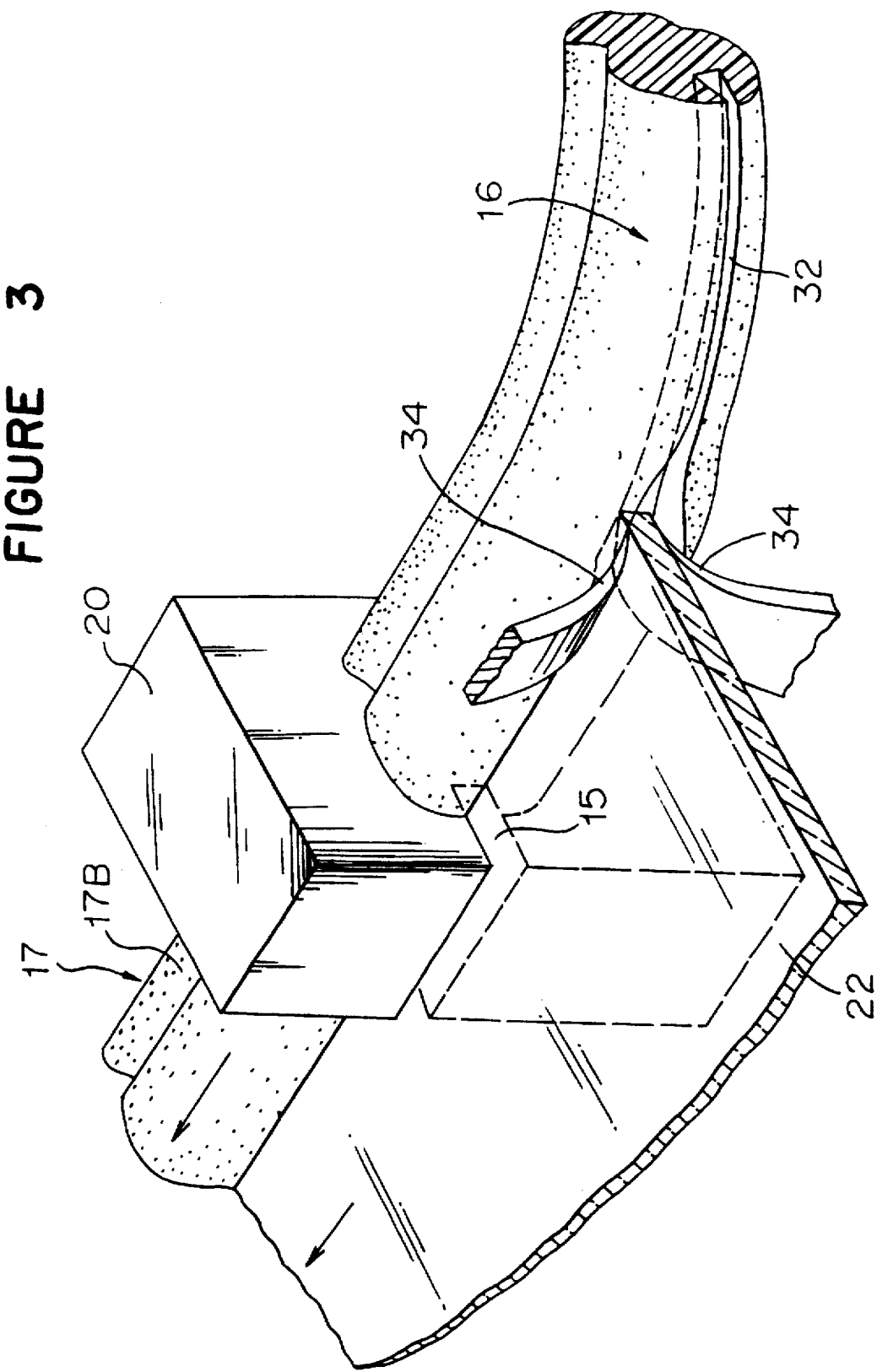
FIG. 3 is a schematic perspective view of an example showing how members are inserted one another at a pressing member and its vicinities in accordance with an example of the present invention.
Figure 4A:
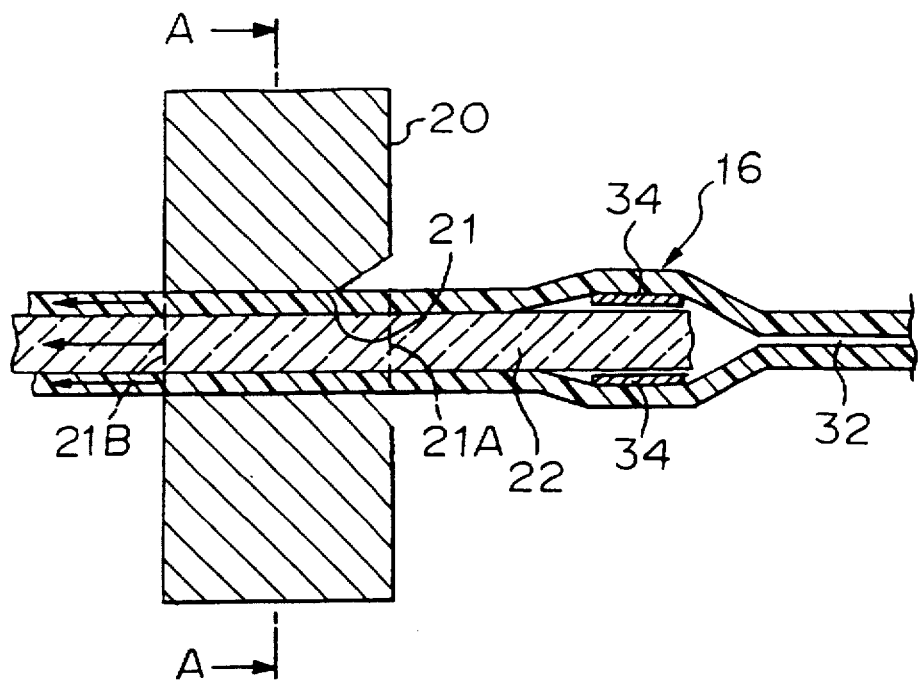
FIGS. 4(a) and (b) are a schematic vertical sectional view of the example showing how the pressing member has the elements inserted therein according to the present invention, and a sectional view taken along line A—A of FIG. 4(a)

In FIG. 3, there is shown a schematic perspective view showing how the members are inserted one another at the pressing member and its vicinities in accordance with an example of the present invention. In FIGS. 4(a) and (b), there are shown a schematic vertical sectional view showing how the members are inserted one another at the pressing member and its vicinities in accordance with the example, and a sectional view along line A—A. The hollow portion 21 in the pressing member 20 has a cross section substantially conformed to an outer shape of the frame in section at the advancing side of the shaped product 16 (at a downstream side 21B in the relative movement of the pressing member with respect to the panel). When the shaped product 16 is passing through the hollow portion 21, the shaped product 16 moves through the hollow portion so as to contact with the inner wall of the pressing member 20. An inlet 21A of the pressing member which is located at the opposite side in the advancing direction may be formed so as to have a larger cross section than the outer shape of the frame in section. The relative movement of the pressing member 20 and the panel 22 allow the frame to be unified to the entire circumference or a part of the peripheral portion of the panel 22 which is inserted into the inserting portion 15 of the pressing member 20.

In the embodiment, the extruded shaped product 16 has such a cross-sectional shape that the shaped product has a biting portion 32 to the panel (the connection portion with the panel) tapered toward an opening. When the frame is unified onto both surfaces of the panel like the embodiment, it is recommendable that the extruded shaped product has such a cross-sectional shape because the panel and the shaped product can be firmly bonded. In this case, a pair of slit plates 34, 34 which can expand the opening of the biting portion 32 may be provided at the upstream side of the pressing member 20 with respect to the relative movement of the pressing member 20 to the panel 22 to make the shaped product 16 smoothly bite the panel 22. The slit plates 34 and 34 may be heated to intensively heat the biting portion 32 of the shaped product 16. In this case, the slit plates have a heating element and so on arranged therein to heat the slit plates. It is preferable that the temperature of the slit plates is set to range from about 100° C. to about 150° C. Such an arrangement can further improve the bonding force between the shaped product 16 and the panel 22.

With respect to the relative movement of the pressing member and the panel, the relative movement can be realized under accurate point to point control by having taught the required movement to an operating robot so that the pressing member relatively moves with respect to the panel and along the peripheral portion thereof.

The slit plates may be arranged in the pressing member. In such a case, the panel is bitten into the shaped product in the pressing member to be unified with the shaped product.

When the panel is used for a vehicle window, the panel with the frame is fitted into a window opening of the vehicle. The state in which the panel with the frame is fitted into the window opening depends on the peripheral (lip) position of a frame portion of the panel with the frame. It means that when the biting portion of the frame into the panel extends to an end surface of the panel, the peripheral position of the frame portion of the panel with the frame varies on the outer size of the panel. If the outer size of the panel involves an error with respect to a preset size, the state in which the panel with the frame is fitted into the window opening might be unacceptable.

Figure 4B:
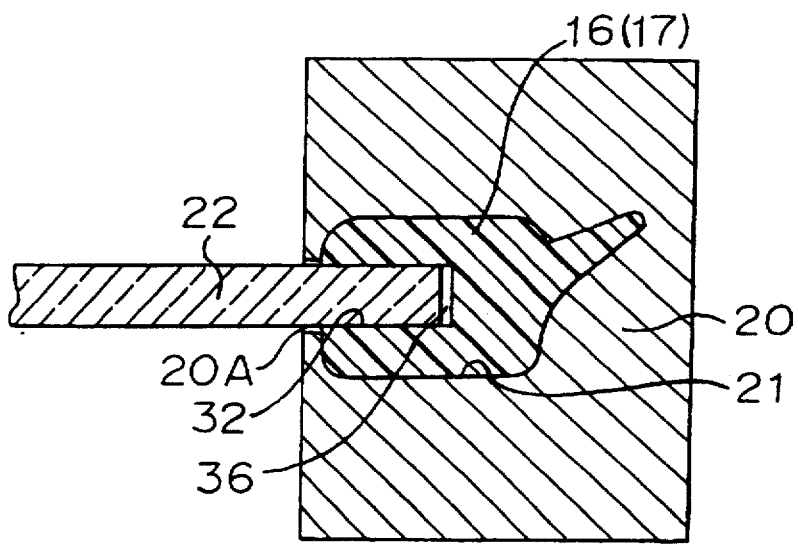

An error in the outer size of the panel 22 itself can be absorbed by having taught movement of the panel to the operating robot so that a space 36 is formed between the bottom of the biting portion 32 with the panel bit in the shaped product 16 and an end surface of the panel 22 preset to have a predetermined size, as shown in FIG. 4(b). If the outer size of the panel is larger than the predetermined size (designed size), the space becomes smaller or disappears. In the reverse case, only an increase in the space occurs, and the panel with the frame has the outer size itself taken such a predetermined size to be fit in the window opening in a good manner at any time. This solution is effective in particular to mass-produce panels with a frame.

This solution will be further described in detail. If the conventionally shaped frame is pressed against the panel by e.g. rollers, the outer size of the panel with the frame is obliged to completely follow the outer size of the panel itself. This means that if the panel has an error in its outer size, the error is reflected in the outer size of the panel with the frame.

In accordance with the present invention, the operating robot (control means therefor) is made to memorize designed size of the panel in advance and to grasp a planned position of the peripheral portion of the panel based on the designed size. The peripheral portion of the panel is relatively moved with respect to the pressing member so that the planned position of the peripheral portion of the panel constantly moves at the predetermined position with respect to the pressing member. In this manner, the outer size of panels which have had a frame unified thereto can be constantly kept constant even if the extent to which the frames bite the panels varies according to the respective panels.

Furthermore, in accordance with the present invention, it is easy to modify the relative movement of the panel and the pressing member because the relative movement is controlled by the operating robot. In detail, an error is sometimes caused between a planned size of the window opening of a vehicle and the actual size of a produced window opening. Such easy modification in the relative movement means that the present invention offers an advantage in that if such an error is caused, the state in which the panel with the frame is fitted into the window opening can be made fine only by modifying the control for the operating robot according to the error. The control of the relative movement according to the present invention can adjust the outer size of the panel with the frame to improve the state with the panel fitted in the window opening even after mass production of vehicles has started.

Figure 5A:
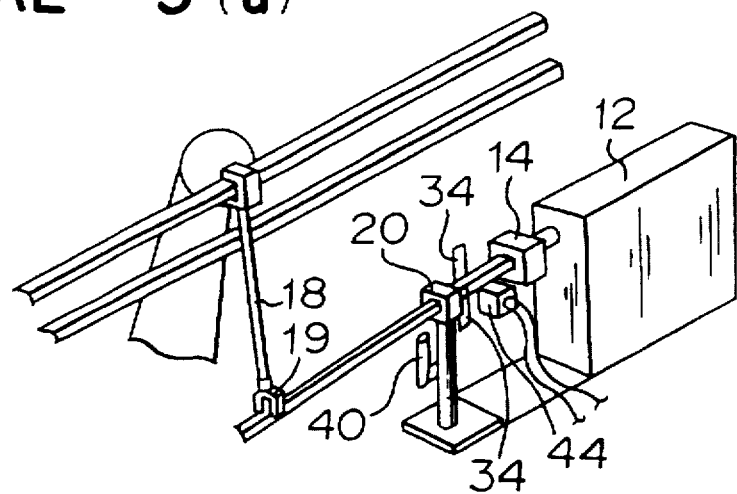
FIGS. 5(a)-(c) are schematic perspective views showing an example of a process for preparing a panel with a frame according to the present invention.

Now, an example of the production process for a panel with a frame in accordance with the present invention will be described with reference to FIGS. 5(a)-(c). First, a resinous material for the frame is extruded from the shaping die 14 mounted to the leading edge of the extruder 12. The shaped product 16 for the frame thus extruded in a predetermined shape is held by a chuck 19 of the pulling device 18. The shaped product 16 is made to advance toward the hollow portion in the pressing member 20, the shaped product has the outermost portion solidified by blowing cooling air onto the shaped product from the blowing means 44, and the shaped product is introduced into the hollow portion (see FIG. 5(a)). At that time, the operating robot 24 is holding the panel at a stand-by position (not shown).

Figure 5B:
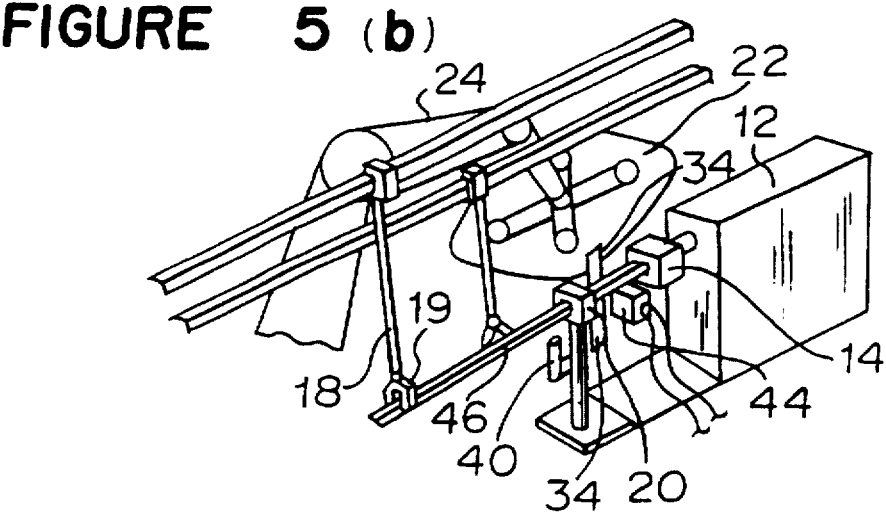
Figure 5C:
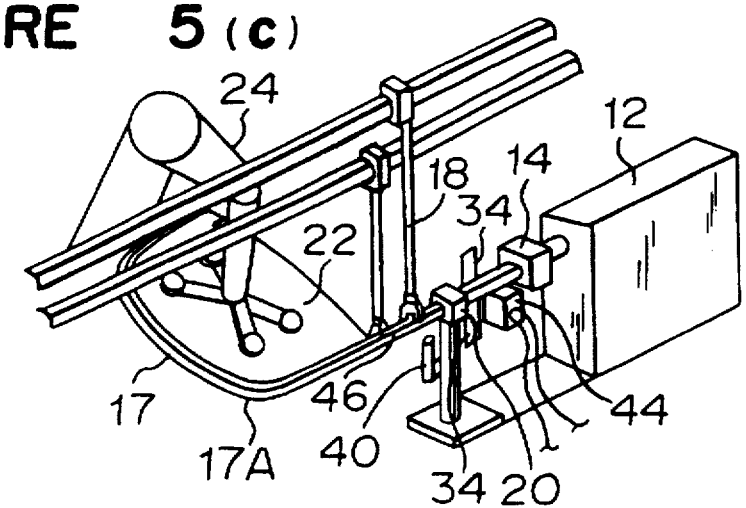

Next, the operating robot 24 is activated to move the panel 22 so that the panel 22 has the peripheral portion inserted into the panel inserting portion of the pressing member 20 (see FIG. 5(b)). It is preferable that an excess portion of the extruded shaped product is cut off by a cutter 46 at that time. The shaped product 16 is pulled by the pulling device before the shaped product is made to bite the panel.

The shaped product 16 is unified to the peripheral portion of the panel 22 by moving the panel 22 so that the pressing member 20 relatively moves with respect to the panel 22 and along the peripheral portion thereof. Finally, the shaped product is cut off by the cutter 46 to separate the unified portion of the shaped product from a portion of the shaped product extending from the shaping die 14 (see FIG. 5(c)). In that manner, the frame can be unified to the peripheral portion of the panel. Furthermore, the remaining shaped product can be advanced by the pulling device to move onto a process to unify a frame to the next panel.

The present invention is not limited to the example just above mentioned. For example, a guide member may be arranged between the shaping die and the pressing member as an alternative to the pulling device. In this case, the shaped product can advance along the guide member to smoothly introduce the shaped product into the hollow portion in the pressing member. However, use of pulling device is recommendable, taking into account that use of the pulling device can cope with various conditions such as a case wherein a certain distance must be ensured between the shaping die and the pressing member to adjust a temperature on the surface of the shaped product.

Figure 6:
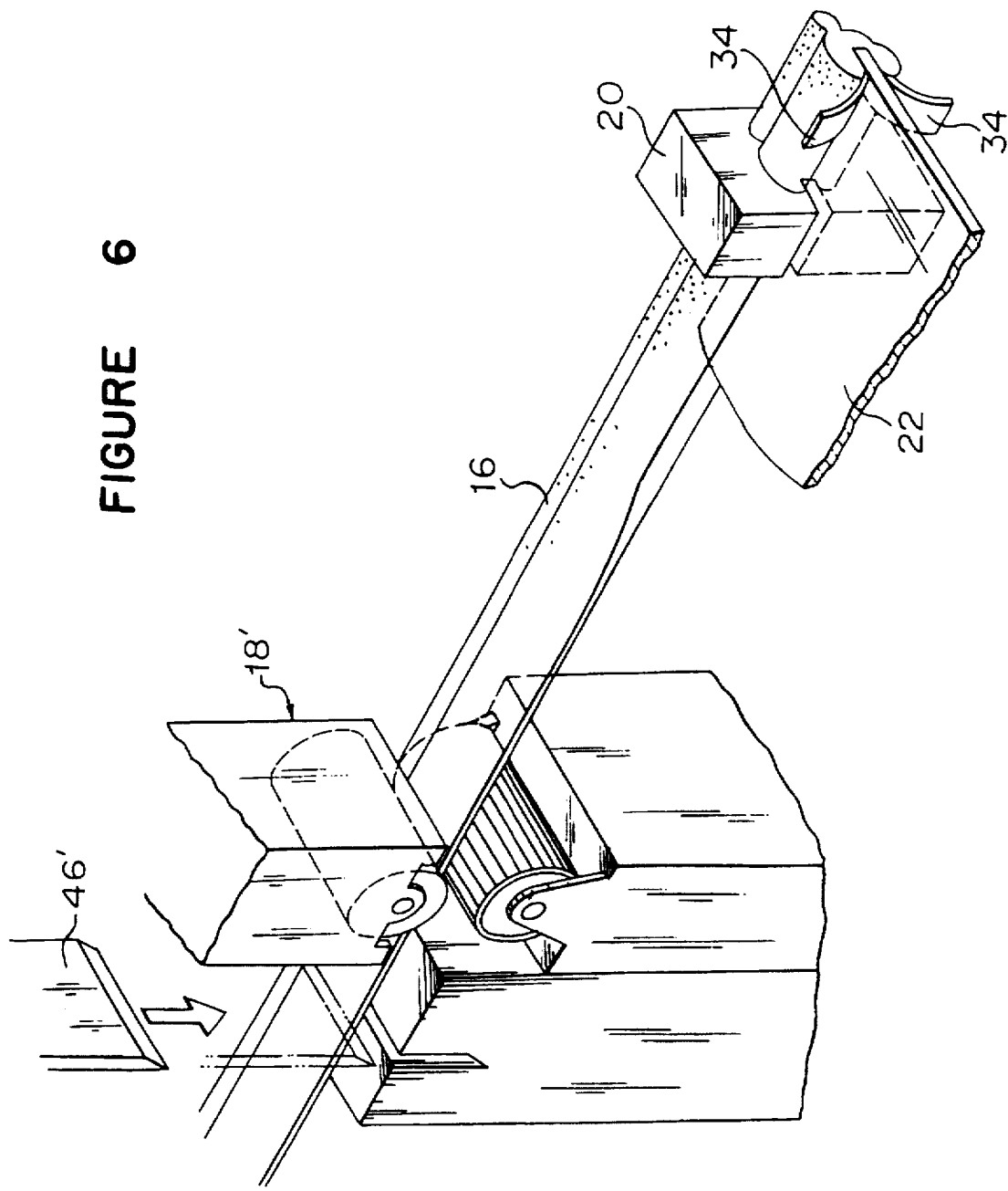
FIG. 6 is a schematic perspective view showing another example of the process according to the present invention.

It is also preferable that a pulling device which is constructed as shown in FIG. 6 is used as an alternative to the pulling device stated earlier. Specifically, the pulley device 18' with rollers as shown is arranged at the side of the pressing member 20 opposite to the shaping die. A cutter 46' can be provided after the pulling device 18' to eliminate the need for provision of a rail above the producing apparatus unlike the case shown in FIG. 5, making the entire apparatus compact. When the panel 22 has had the peripheral portion bitten into the shaped product 16, it is not necessary to pull the shaped product by the pulling device because the relative movement of the panel with respect to the pressing member allows the shaped product to move along with the panel. In such a case, at least one of the upper and lower rollers shown in FIG. 6 may be separated from the shaped product when the panel is bitten into the shaped product.

Although in the example just above mentioned the panel is moved to obtain the relative movement of the pressing member with respect to the peripheral portion of the panel, the pressing member itself may be moved, or the movement of the panel and the pressing member may be controlled to obtain the relative movement. It is enough that the panel and the pressing member carry out the relative movement along the peripheral portion of the panel. Since moving the pressing member requires to move the shaping die or the pulling device as well, moving only the panel is preferable.

The speed at which the panel and the pressing member relatively move has no limitation. The speed may be constant, or the speed may be increased or decreased at e.g. a corner of the panel. In the case wherein the speed is increased or decreased, the throughput of the resinous material may be changed according to the change of the speed.

The error with respect to the predetermined size of the panel has been already discussed. The error was related to the outer size. If the panel is formed in a bending shape, an error in curvature as well as the error in outer shape would possibly occur. The error in curvature can be dealt with by e.g. the following measures: the panel has an upper portion moved with respect to the pressing member in advance so that the panel has an upper surface pressed against an upper surface of the inserting portion in the pressing member to a certain extent. Even if the panel has an error in curvature, the measures can absorb the error in curvature by making the upper surface of the panel relatively move so as to constantly contact with the upper surface of the inserting portion in the pressing member. In the measures, it is preferable that fluorocarbon resin coating is applied to the contacting surface of the inserting portion with the panel. The example just above mentioned is called upper surface follow. Lower surface follow is also applicable, and it can offer similar effects.

When a predetermined pressure is applied to the shaped product to press it against the panel in accordance with the present invention, the panel is sometimes likely to have a corner deformed in comparison with a linear portion of the panel, which is noticeable in the case of the panel having large curvature at the corner. In such a case, it is recommendable to release the pressing force to the shaped product by the pressing member at only a portion which is likely to be deformed (e.g. the corner). Specifically, such an operation can be carried out by e.g. open the pressing member in upper and lower directions or releasing pushing means (pushing by e.g. an air cylinder through e.g. a roller) on the pressing member at the corner of the panel.

In some cases, it is preferable to cool the shaped product before or after the shaped product passes through the pressing member as stated earlier. Although blowing cooled air or mist has been described in the example, the shaped product may be quenched by contacting the shaped product with a cooling member which has a groove formed to substantially conform with the shape of the shaped product. However, it is preferable to blow cooled air to cool the shaped product in a non-contact manner in consideration of good appearance of the surface of the unified frame.

With regard to the panel used in the present invention, various types of panels used as a windowpane for a vehicle or building, such as a single glass sheet, laminated glass, laminated glass with a transparent synthetic resin film laminated on a glass sheet, and pair glass, are selectively adopted according to applications. Those types of glass sheets may be subjected to bending process, tempering treatment, function coating treatment or the like. Besides those glass sheets, a transparent organic resinous sheet called organic glass, or a glass sheet with the organic glass laminated thereon can be adopted.

Examples of the resinous material for the frame used in the present invention include materials usable in extrusion, such as a thermoplastic resin, and a thermoset or moisture setting resin which are heated and melted for use. Examples of the thermoplastic resin include a polyvinyl chloride, a copolymer of a vinyl chloride and an ethylene, a styrene resin and an olefin resin. Examples of the thermoset resin and the moisture setting resin include an urethane resin and a silicone resin. Besides, there can be used e.g. a vinyl chloride in a sol state which is extruded from the shaping die, is shaped and then is heated so as to be formed as the frame.

Among those materials, it is preferable to select the thermoplastic resin in order that the extruded shaped product has only the outermost portion solidified so as to posses excellent adhesion at the connection portion with the panel. Although also in the case of using the moisture setting resin or the thermoset setting resin, moisture or heat can be given only to the surface of the extruded shaped product to solidify only the outermost portion of the shaped product, it is difficult to control the extent of solidification. On the other hand, the thermoplastic resin can easily solidify only the surface of the shaped product to the extent that neither deformation nor irregularities on the surface occurs because the thermoplastic resin can be subjected to cooling or self-cooling to solidify only a portion having a lower temperature even if the resin is melted to form an extrusion grade.

The shape of the frame is suitably determined according to applications or the like. The frame is unified to the panel so as to be attached on a single surface of the panel, a single surface and an end surface of the panel or opposite surfaces of the panel to cover the peripheral portion of the panel, according to applications or other factors. The method according to the present invention is the most effective when the frame is unified to the opposite surfaces of the panel. In other words, the present invention offers excellent advantages in that it is possible not only to make the appearance of the frame good but also to control the outer size of the panel with the frame with accuracy, which have not been offered by the prior art. In the case of unifying the frame to the opposite surfaces of the panel, the frame itself is exposed at the window opening, which means that if the appearance is poor the commercial value of the product lowers.

In accordance with the present invention, even if there is caused vibration due to movement of the panel or the pressing member, it is possible to prevent the frame from having poor appearance because the panel and the shaped product for the frame are unified together using the pressing member after having extruded the shaped product. In particular, the outermost portion of the shaped product which has already solidified by solidifying only the outermost portion of the shaped product can prevent the appearance from being damaged to such vibration and from being deformed by the pressing member.

The relative movement of the panel and the pressing member is carried out along the track which has been memorized in advance. As a result, even if there is an error in size of the panel, the error can be absorbed to prepare the panel with the frame unified thereto at the predetermined outer size.

What is claimed is:

1. A method for preparing a panel with a resinous frame member wherein the resinous frame member is unified to at least one surface of the panel at a peripheral portion thereof, comprising:

extruding a resinous material for the frame member in a predetermined shape from a resin shaping die to form a shaped product;

providing a pressing member at a position spaced apart from the shaping die by a predetermined distance, the pressing member having a stationary interior profile which substantially conforms to an outer shape of the frame member and substantially encloses said frame member, wherein said frame member slides past said interior profile;

advancing the shaped product extruded from the die through the interior profile;

inserting a peripheral portion of the panel into a panel inserting portion of the pressing member to arrange the pressing member at the peripheral portion of the panel; and unifying the shaped product to at least one surface of the peripheral portion of the panel by pressing the shaped product against the panel while relatively moving the pressing member with respect to the panel and along the peripheral portion thereof.

2. A method according to claim 1, wherein it further comprises quenching an outer surface of the shaped product before arriving at the hollow portion, thereby to lower a temperature of an outermost portion of the shaped product to less than that of a connection portion of the shaped product with the panel.

3. A method according to claim 1, wherein it further comprises quenching the shaped product after having unified the shaped product to the panel.

4. A method according to claim 3, wherein it further comprises blowing cooled air on the shaped product to quench the shaped product.

5. A method according to claim 3, wherein it further comprises quenching a portion of the shaped product which corresponds to a corner of the panel.

6. A method according to claim 1, wherein the frame is unified to opposite surfaces of the panel, and the panel and the pressing member are relatively placed so that there is formed a space between a panel biting portion of the shaped product and an end surface of the panel preset in a predetermined size.

7. A method according to claim 1, wherein the frame is unified to opposite surfaces of the panel, the shaped product has a panel biting portion formed to taper toward an opening of the biting portion just after having been extruded, and a slit plate is arranged between the pressing member and the shaping die to expand the opening of the biting portion so as to have the panel bit into the shaped product.

8. A method according to claim 1, wherein the resinous material is a thermoplastic material.

9. A method according to claim 8, wherein the thermoplastic material is extruded from the shaped die at a temperature in a range of 150° C.–190° C.

10. A method according to claim 1, wherein the panel is a glass sheet for a vehicle window.

11. A method according to claim 1, wherein it further comprises:

holding the panel by an operating robot to move the panel according to a track that has been memorized in the robot; and relatively moving the pressing member with respect to the panel and along the peripheral portion thereof.

12. A method according to claim 11, wherein it further comprises quenching an outer surface of the shaped product before arriving at the hollow portion, thereby to lower a temperature of an outermost portion of the shaped product to less than that of a connection portion of the shaped product with the panel.

13. A method according to claim 11, wherein it further comprises quenching the shaped product after having unified the shaped product to the panel.

14. A method according to claim 13, wherein it further comprises blowing cooled air on an outer surface of the shaped product to quench the outer surface of the shaped product.

15. A method according to claim 13, wherein it further comprises quenching a portion of the shaped product which corresponds to a corner of the panel.

16. A method according to claim 11, wherein the frame is unified to opposite surfaces of the panel, and the panel and the pressing member are relatively moved so that there is formed a space between a panel biting portion of the shaped product and an end surface of the panel preset in a predetermined size.

17. A method according to claim 11, wherein the frame is unified to opposite surfaces of the panel, the shaped product is formed so that it has a panel biting portion formed to taper toward an opening just after having been extruded, and a slit plate is arranged between the pressing member and the shaping die to expand the opening of the biting portion so as to have the panel bit into the shaped product.

18. A method according to claim 11, wherein the resinous material is a thermoplastic material.

19. A method according to claim 18, wherein the thermoplastic material is extruded from the shaped die at a temperature in a range of 150° C.–190°C.

20. A method according to claim 11, wherein the panel is a glass sheet for a vehicle window.

* * * * *